United States Patent
Yang et al.

(10) Patent No.: US 8,913,214 B2
(45) Date of Patent: Dec. 16, 2014

(54) BACKLIGHT ASSEMBLY AND LIQUID CRYSTAL DISPLAY DEVICE HAVING THE SAME

(75) Inventors: Yong-Seok Yang, Asan-si (KR); Joo-Young Kim, Cheonan-si (KR); Jung-Tae Kang, Suwon-si (KR); Jin-Ho Ha, Suwon-si (KR)

(73) Assignee: Samsung Display Co., Ltd. (KR)

( * ) Notice: Subject to any disclaimer, the term of this patent is extended or adjusted under 35 U.S.C. 154(b) by 518 days.

(21) Appl. No.: 11/931,287

(22) Filed: Oct. 31, 2007

(65) Prior Publication Data

US 2008/0143917 A1 Jun. 19, 2008

(30) Foreign Application Priority Data

Dec. 15, 2006 (KR) .................. 10-2006-0128421

(51) Int. Cl.
*G02F 1/1333* (2006.01)
*G02F 1/1335* (2006.01)

(52) U.S. Cl.
CPC .... G02F 1/133608 (2013.01); *G02F 1/133604* (2013.01)
USPC .............................. 349/70; 349/58

(58) Field of Classification Search
USPC .................. 349/58; 439/620.02; 362/257, 368
See application file for complete search history.

(56) References Cited

U.S. PATENT DOCUMENTS

| 7,670,019 | B2 * | 3/2010 | Kang ......................... 362/97.1 |
| 2004/0001340 | A1 * | 1/2004 | Shin .............................. 362/225 |
| 2004/0047149 | A1 * | 3/2004 | Amano et al. ............... 362/225 |
| 2006/0145573 | A1 * | 7/2006 | Fukuda ......................... 312/7.2 |
| 2007/0286629 | A1 * | 12/2007 | Kwon et al. .................... 399/69 |
| 2008/0079862 | A1 * | 4/2008 | Lee ................................. 349/58 |

FOREIGN PATENT DOCUMENTS

| CN | 1489178 A | 4/2004 |
| JP | 2002216914 A | 8/2002 |
| JP | 2003234012 A | 8/2003 |
| JP | 2004171975 A | 6/2004 |
| JP | 2004-294592 A | * 10/2004 |
| JP | 2005158585 A | 6/2005 |
| JP | 2006004927 A | 1/2006 |
| KR | 1020060077540 A | 7/2006 |
| KR | 1020060081590 A | 7/2006 |

* cited by examiner

*Primary Examiner* — Mike Stahl
(74) *Attorney, Agent, or Firm* — Cantor Colburn LLP

(57) ABSTRACT

A backlight assembly includes at least one lamp including a lamp electrode, at least one lamp socket holding the lamp, an inverter applying electric power to the lamp, and a receiving container including a socket receiving portion corresponding to an end portion of the lamp to receive the lamp socket and an inverter receiving portion for receiving the inverter. Therefore, a manufacturing process may be simplified, and manufacturing costs is decreased.

13 Claims, 8 Drawing Sheets

BACKLIGHT ASSEMBLY AND LIQUID CRYSTAL DISPLAY DEVICE HAVING THE SAME

CROSS-REFERENCE TO RELATED APPLICATIONS

The present application claims priority to Korean Patent Application No. 2006-128421, filed on Dec. 15, 2006, and all benefits accruing therefrom under 35 U.S.C. §119, the contents of which are incorporated herein by reference in their entirety.

BACKGROUND OF THE INVENTION

1. Field of the Invention

The present invention relates to a backlight assembly and a liquid crystal display (LCD) device having the same.

2. Description of the Related Art

A liquid crystal display (LCD) device, displays an image using the optical and electrical characteristics of liquid crystals.

The LCD device comprises a liquid crystal control unit and a light supplying unit. The liquid crystal control unit controls the liquid crystals while the light supplying unit supplies the liquid crystal control unit with light. For example, the LCD device comprises a LCD panel as the liquid crystal control unit and a backlight assembly that serves as the light supplying unit. The backlight assembly comprises a light source that generates the light. The backlight assembly is classified as either an edge illumination type backlight assembly or a direct illumination type backlight assembly. The edge illumination type backlight assembly comprises a light-guide plate adjacent to a lamp to guide the light toward the LCD panel. The direct illumination type backlight assembly comprises a diffusion plate to diffuse the light generated from the lamp so that the diffused light is incident on the LCD panel.

A lamp socket, in general, affixes the lamp to the receiving container. The direct illumination type backlight assembly comprises a plurality of lamps aligned in the receiving container using an aligning plate to fix lamp sockets. For example, the lamp sockets are inserted into receiving holes, and the lamp sockets are fixed to the receiving container through the aligning plate.

When the backlight assembly comprises lamp sockets and the aligning plate to fix the lamps to the receiving container, the method of manufacturing of the LCD device is complicated. This is because in order to use lamp sockets and an aligning plate in the LCD device, a die and mold are used to manufacture lamp sockets and the aligning plate thereby increasing manufacturing costs. In addition, impurities flow into a space between the lamp sockets and the aligning plate. When the shape of the LCD device is changed, the location of the sockets and the shape of the aligning plate are also changed. Thus, the manufacturing costs and manufacturing time are increased.

SUMMARY OF THE INVENTION

The present invention provides a backlight assembly that can be manufactured using automation. The present invention also involves a simplified manufacturing process, with decreased manufacturing costs.

The present invention also provides a liquid crystal display (LCD) device having the above-mentioned backlight assembly.

In one embodiment, a backlight assembly comprises at least one lamp including a lamp electrode, at least one lamp socket holding the lamp, an inverter applying electric power to the lamp, and a receiving container including a socket receiving portion corresponding to an end portion of the lamp to receive the lamp socket and an inverter receiving portion for receiving the inverter.

The socket receiving portion may be formed at an extended sidewall that protrudes from an upper side of a longitudinal sidewall that protrudes from a longitudinal edge of a bottom plate of the receiving container.

The socket receiving hole may be separated from the inverter receiving portion by a separating bar extended from an end portion of the longitudinal sidewall. The socket receiving portion may further comprise a stepped portion on a side surface facing the lamp socket so that the lamp socket is combined with the socket receiving portion through a sliding combination. The socket receiving portion may further include a hook portion on the stepped portion to hold the lamp socket.

The socket receiving portion may be separated from the inverter receiving portion by a portion that protrudes from an end portion of the longitudinal sidewall. The socket receiving portion may further include a stepped portion on a side surface facing the lamp socket so that the lamp socket is combined with the socket receiving portion in a vertical direction.

A hole or a plurality of holes for dissipating heat generated from the inverter may be formed through the bottom plate. The receiving container may include a combining portion through which the receiving container is combined with a bottom chassis. The combining portion may be formed on an opposite longitudinal sidewall adjacent to corners of the receiving container, and the opposite longitudinal sidewall may face the longitudinal sidewall adjacent to the socket receiving portion.

A window may be formed on a horizontal sidewall of the receiving container to dissipate heat generated from the inverter.

The lamp socket may include a lamp holding part electrically connected to the lamp electrode and an inverter holding part on a lower portion of the lamp socket to receive electric power for driving the lamp.

An LCD device comprises an LCD panel that displays an image, and a backlight assembly that supplies the LCD panel with light. The backlight assembly comprises at least one lamp including a lamp electrode, at least one lamp socket for holding the lamp electrode, an inverter for applying electric power to the lamp, and a receiving container comprising a socket receiving portion that corresponds to an end portion of the lamp to receive the lamp socket and an inverter receiving portion for receiving the inverter.

The process is advantageous because an aligning plate for aligning the lamp sockets may be omitted so that the manufacturing process for the backlight assembly may be automated. Thus, the manufacturing process may be simplified, and a manufacturing time period may be decreased. In addition, manufacturing costs may be decreased.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

Figure 1:
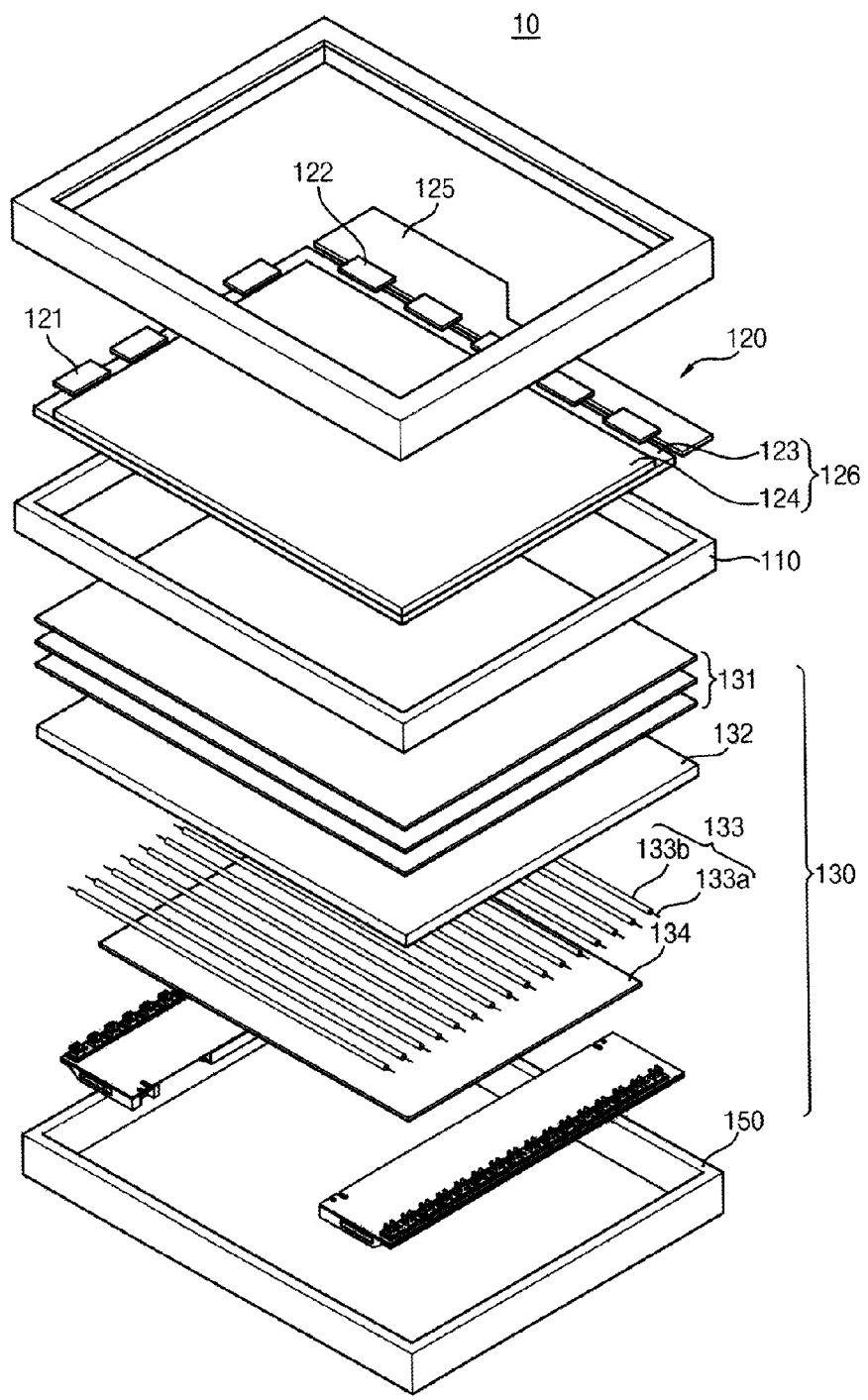
FIG. 1 is an exemplary exploded perspective view illustrating a liquid crystal display (LCD) device in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" comprises any and all combinations of one or more of the associated listed items.

It will be understood that, although the terms first, second, third or the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is an exemplary exploded perspective view illustrating a liquid crystal display (LCD) device in accordance with one embodiment of the present invention.

Referring to FIG. 1, the LCD device 10 comprises an LCD panel assembly 120, a backlight assembly 130 and a middle mold 110.

The LCD panel assembly 120 comprises an LCD panel 126, a gate tape carrier package (gate TCP) 121, a data tape carrier package (data TCP) 122 and a printed circuit board (PCB) 125. The LCD panel 126 comprises a thin-film transistor (TFT) substrate 123, an opposite substrate 124 and a liquid crystal layer (not shown).

The TFT substrate 123 of the LCD panel 126 comprises a gate line (not shown), a data line (not shown), a TFT array (not shown), a pixel electrode (not shown), or the like. The opposite substrate 124 faces the TFT substrate 123, and comprises a black matrix, a common electrode, or the like.

The PCB 125 comprises a plurality of driving elements to generate gate and data driving signals to apply the gate and data driving signals to the gate TCP 121 and the data TCP 122, respectively.

The backlight assembly 130 comprises optical sheets 131, an optical plate 132, a lamp 133 and a reflecting sheet 134.

The lamp 133 may include a light-emitting diode (LED), a cold cathode fluorescent lamp (CCFL), an external electrode fluorescent lamp (EEFL), or the like. The lamp 133 generates light based on a driving voltage applied to the lamp 133. For example, a plurality of lamps 133 is electrically connected to each other, in parallel, and is spaced apart from each other to form a direct illumination type backlight assembly. The lamps 133 may be aligned in a longitudinal direction of the LCD panel 126 so that discharge gas in the lamps 133 is uniformly distributed, thereby improving luminance uniformity of the backlight assembly 130.

Figure 2:
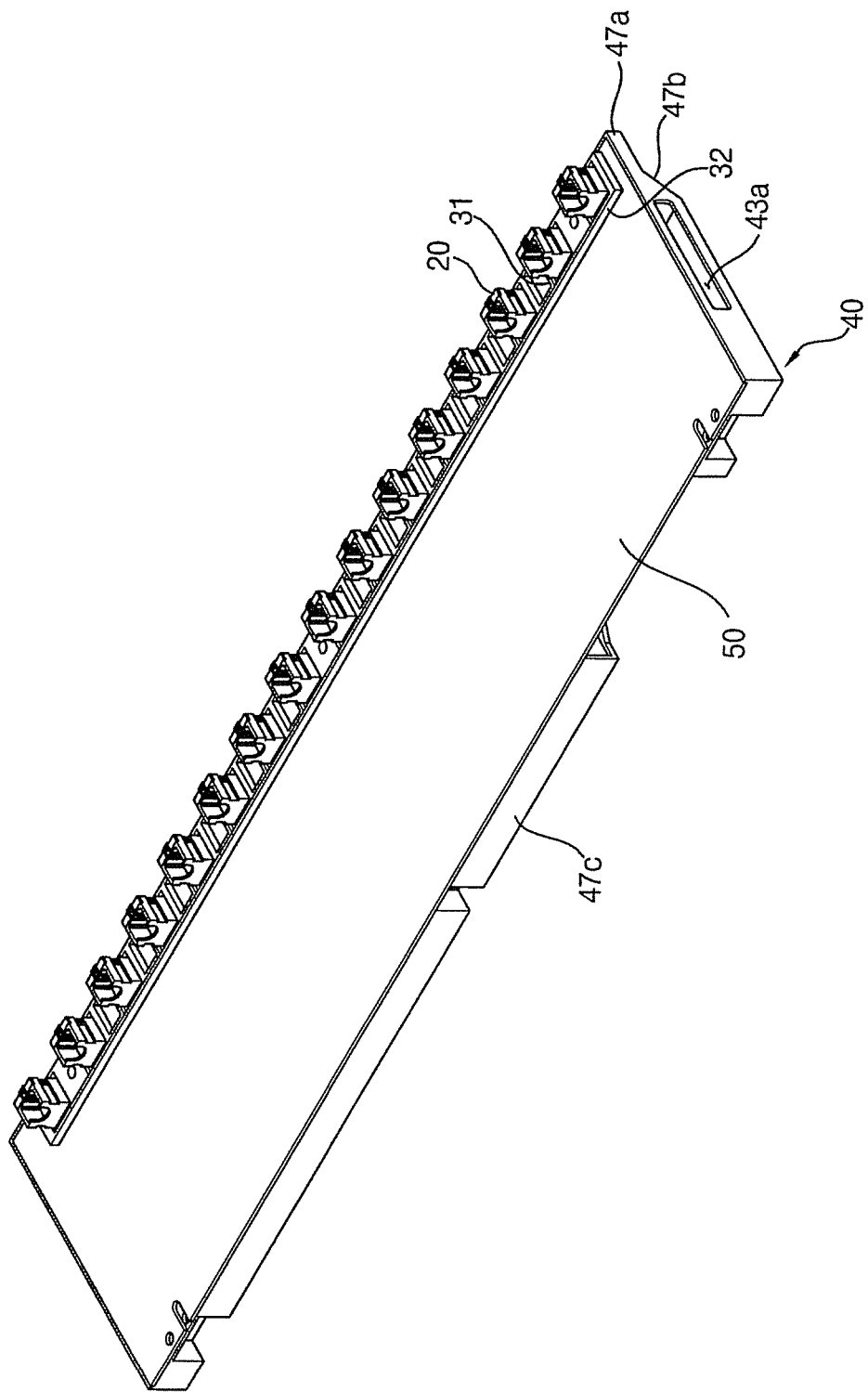
FIG. 2 is an exemplary perspective view illustrating an inverter received in an inverter receiving container shown in FIG. 1.
Figure 3:
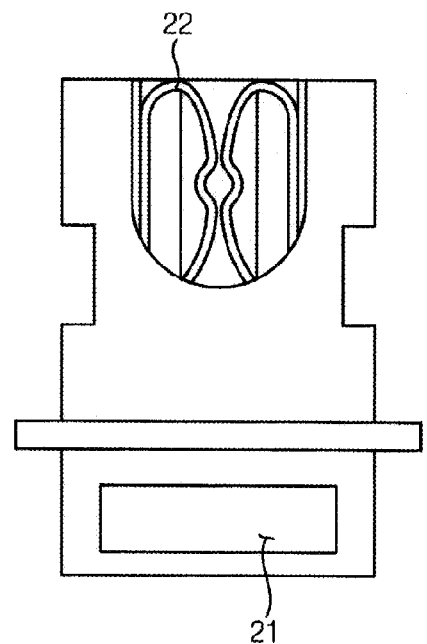
FIG. 3 is an exemplary cross-sectional view illustrating a lamp socket shown in FIG. 1.

FIG. 2 is a perspective view illustrating an inverter received in an inverter receiving container shown in FIG. 1. FIG. 3 is a cross-sectional view illustrating a lamp socket shown in FIG. 1.

Referring to FIGS. 1 to 3, a lamp socket 20 is combined with an inverter receiving container 40 through a socket receiving hole to support and hold end portions of the lamp 133. The lamp 133 comprises a lamp electrode 133a and a lamp tube 133b. The lamp electrode 133a is in communication with an inverter holding part 21 to be fixed to the lamp socket 20. The lamp tube 133b comprises a fluorescent material to generate the light based on electric power applied to the lamp electrode 133a.

The diffusion plate 132 disposed upon above the lamp 133 to improve optical characteristics such as luminance, luminance uniformity, or the like, of the light generated from the lamp 133.

The optical sheets 131 are disposed upon the diffusion plate 132 to diffuse and condense the light generated from the lamp 133. The optical sheets 131 may include a diffusion sheet, a first prism sheet, a second prism sheet, or the like, or a combination comprising at least one of the foregoing.

In one embodiment, the first prism sheet is disposed upon the diffusion sheet, and comprises a plurality of triangular prism patterns (not shown) arranged in a predetermined direction to condense diffused light that has been transmitted through the diffusion sheet. The second prism sheet is disposed upon the first prism sheet. The second prism sheet is a multi-layered reflective type polarizing prism sheet that improves luminance in the direction away from the lamp 133 and towards the LCD panel 126. The light passing through the first prism sheet is of a requisite intensity, the second prism sheet may be omitted.

The reflection sheet 134 is disposed under the lamp 133 to reflect the light emitted from the lamp 133 toward an upper portion of the backlight assembly 130 (i.e., towards the LCD panel 126). The reflection sheet 134 comprises a highly reflective material that is used to improve luminance of the backlight assembly 130.

The middle mold 110 supports the LCD panel assembly 120, and is combined with a sidewall of a bottom chassis 150 to facilitate the fixing of the locations of the lamp 133, the diffusion plate 132 and the optical sheets 131 between the middle mold 110 and the bottom chassis 150.

The lamp 133, the diffusion plate 132, the optical sheets 131 and the reflection sheet 134 are disposed upon the bottom chassis 150.

Figure 4:
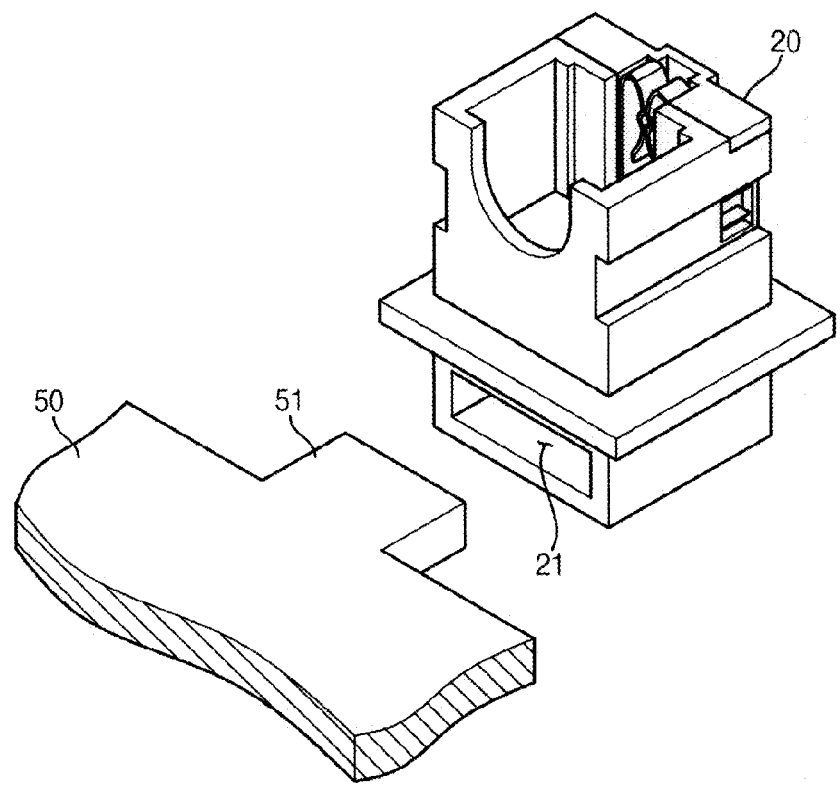
FIG. 4 is an exemplary perspective view illustrating a combination of an inverter and a power supplying terminal shown in FIG. 1.
Figure 5:
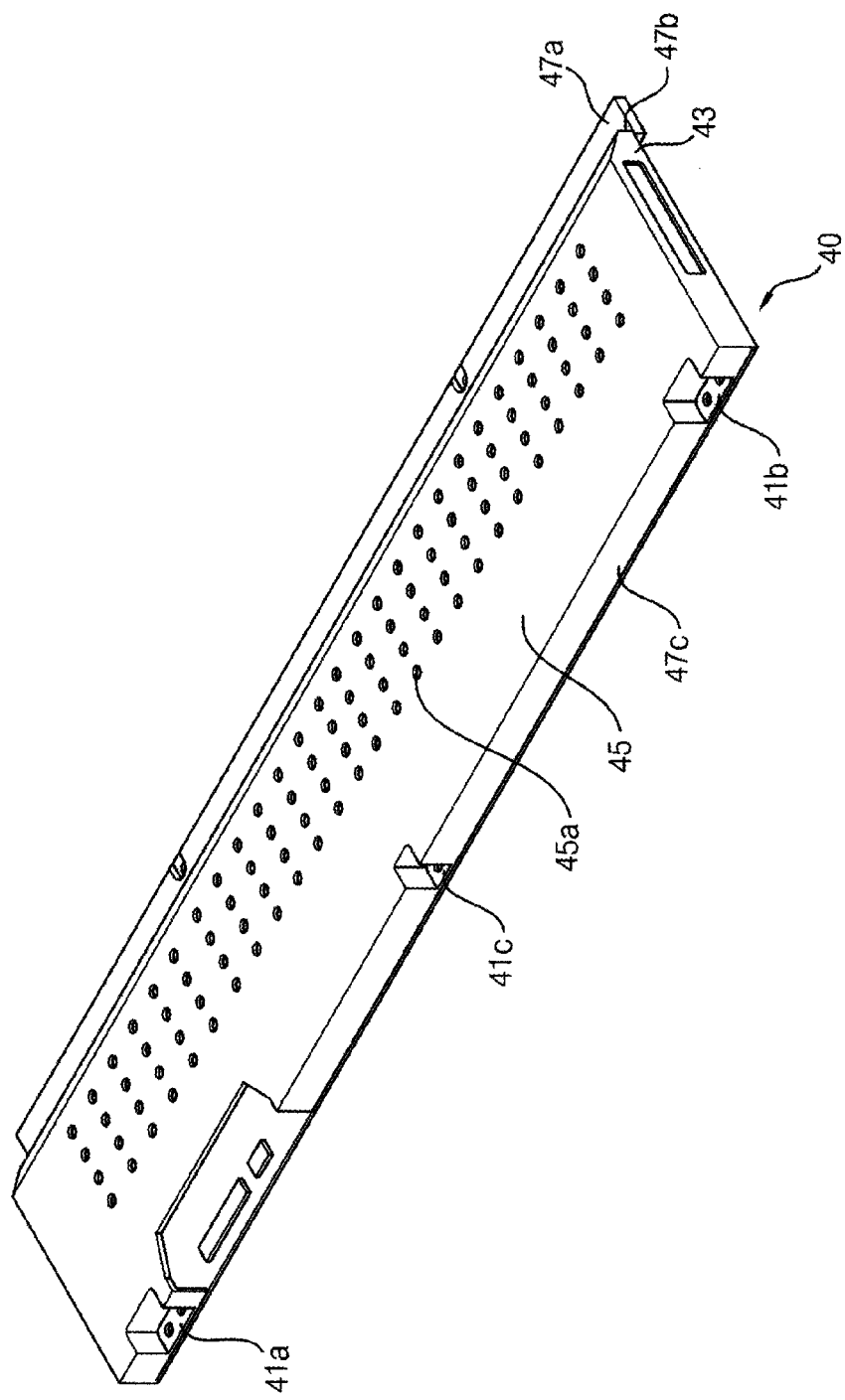
FIG. 5 is an exemplary perspective view illustrating a rear surface of the receiving container shown in FIG. 1.

FIG. 4 is a perspective view illustrating a combination of an inverter and a power supplying terminal shown in FIG. 1. FIG. 5 is a perspective view illustrating a rear surface of the receiving container shown in FIG. 1.

Referring to FIGS. 1 to 5, the lamp socket 20 comprises a lamp holding part 22 and an inverter holding part 21. The lamp holding part 22 is on the upper portion of the lamp socket 20 to hold the lamp electrode 133a, and is in electrical communication with a lead wire (not shown). As can be seen in FIG. 2, the inverter holding part 21 is on a lower portion of the lamp socket 20 to receive the electric power for driving the lamp 133. The lamp socket 20 is combined with the inverter receiving container 40 through a socket receiving hole.

As can be seen in the FIG. 2, the socket receiving hole is formed on an extended wall 47a that protrudes from an upper side of a longitudinal sidewall 47b of the inverter receiving container 40. The longitudinal sidewall 47b protrudes from a longitudinal edge of a bottom plate 45. For example, the socket receiving hole may be separated from a space for receiving the inverter 50 by a separating bar 32 extended from an end portion of the longitudinal sidewall 47b to prevent an electric interaction between the lead wire and the inverter 50.

The socket receiving hole may further include a stepped portion (not shown) on the side surface facing the lamp socket 20 so that the lamp socket 20 may slide along the side surface of the socket receiving hole and may be received in the socket receiving hole at a predetermined depth. Thus, the lamp socket 20 may be securely combined with the inverter receiving container 40. In addition, the socket receiving hole may have a hook hole so that the lamp socket 20 may be hooked in the socket receiving hole.

After the lamp socket 20 is inserted into the socket receiving hole of the inverter receiving container 40 by sliding it in, an inverter pad 51 of the inverter 50 is inserted into the inverter holding part 21 of the lamp socket 20 by a sliding it in, so that the inverter 50 is in electrical communication with the lamp socket 20.

The socket receiving hole is formed at the extended side wall that protrudes from the longitudinal sidewall of the inverter receiving container 40. Slots 41a, 41b and 41c are formed on an opposite longitudinal sidewall 47c of the inverter receiving container 40. The bottom chassis 150 is combined with the inverter receiving container 40 through the slots 41a, 41b and 41c of the inverter receiving container 40. For example, the slots 41a, 41b and 41c may comprise a plurality of holes for combining the bottom chassis 150 with the inverter receiving container 40.

In FIGS. 1 to 5, the bottom plate 45, the longitudinal sidewall 47b, the opposite longitudinal sidewall 47c and horizontal sidewalls 43 of the receiving container 40 form an inverter receiving portion. For example, the inverter receiving portion has a space for receiving the inverter.

A window 43a may be formed on the horizontal sidewall 43 to dissipate heat generated from the inverter and the lamp 133. The bottom plate 45 supports the inverter 50. Also, a plurality of holes 45a may be formed through the bottom plate 45 to dissipate the heat generated from radiation as well as from electric elements such as transformers. For example, the holes 45a are spaced apart from each other by a constant distance. When an amount of the heat is increased, the distance between adjacent holes 46a may be decreased.

Figure 6:
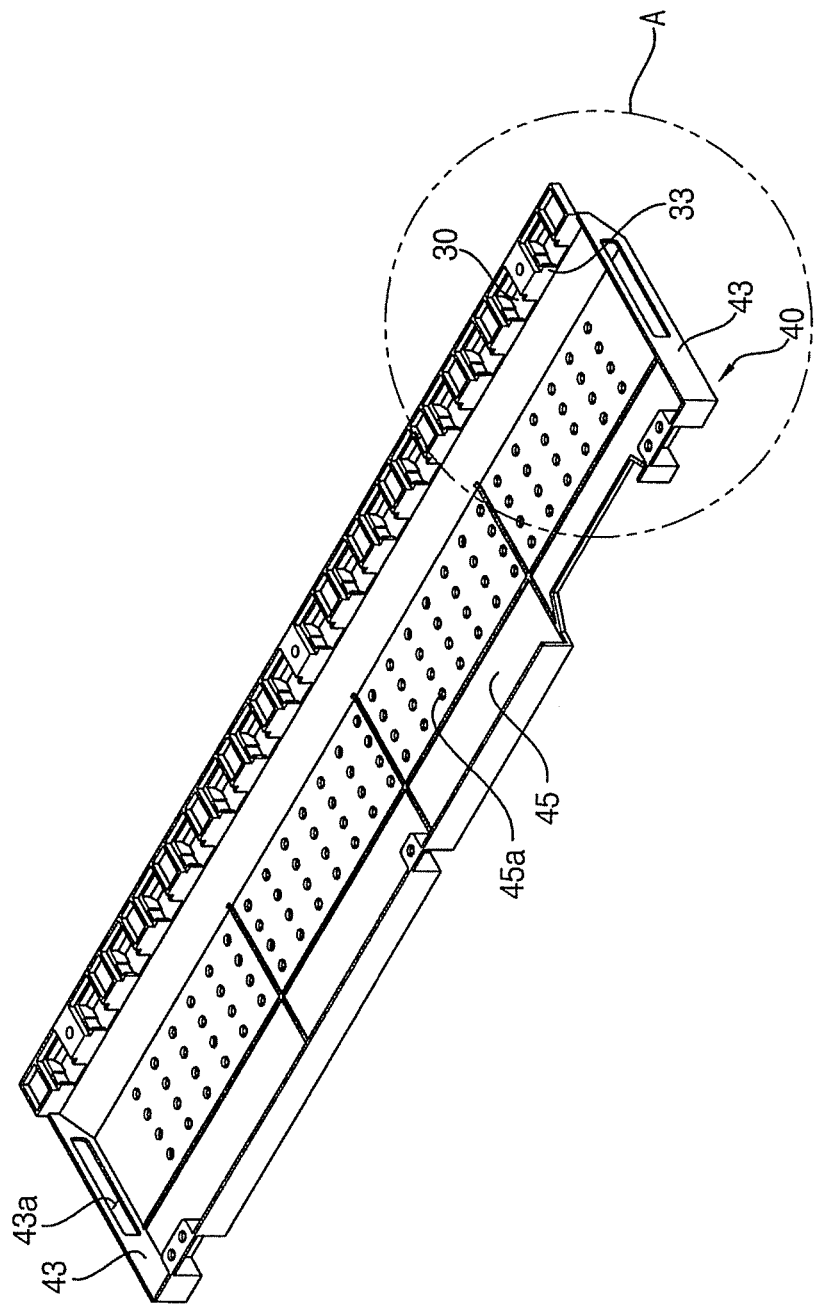
FIG. 6 is an exemplary perspective view illustrating a receiving container in accordance with another exemplary embodiment of the present invention without the lamp sockets shown in FIG. 1.
Figure 7:
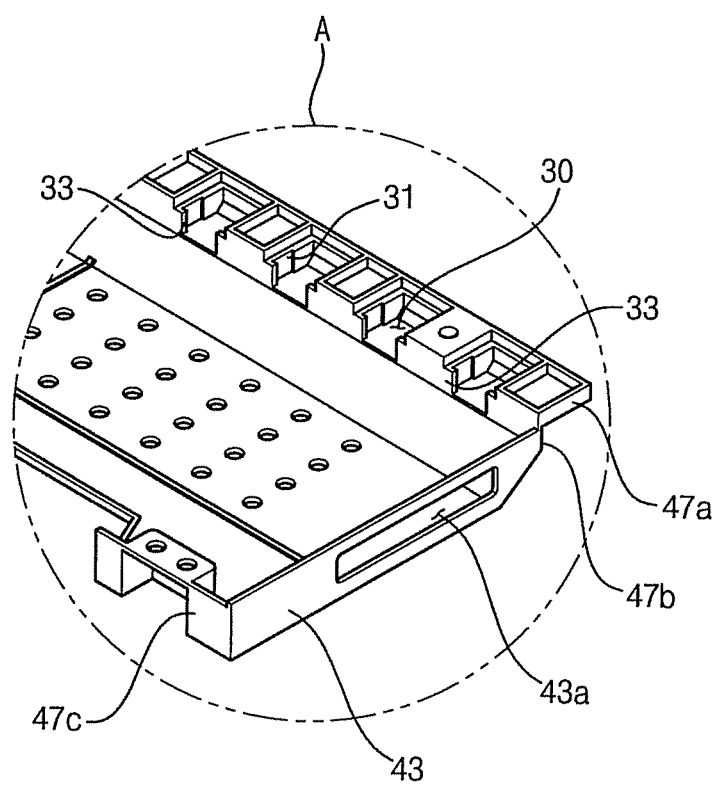
FIG. 7 is an exemplary enlarged perspective view illustrating a portion 'A' shown in FIG. 6.
Figure 8:
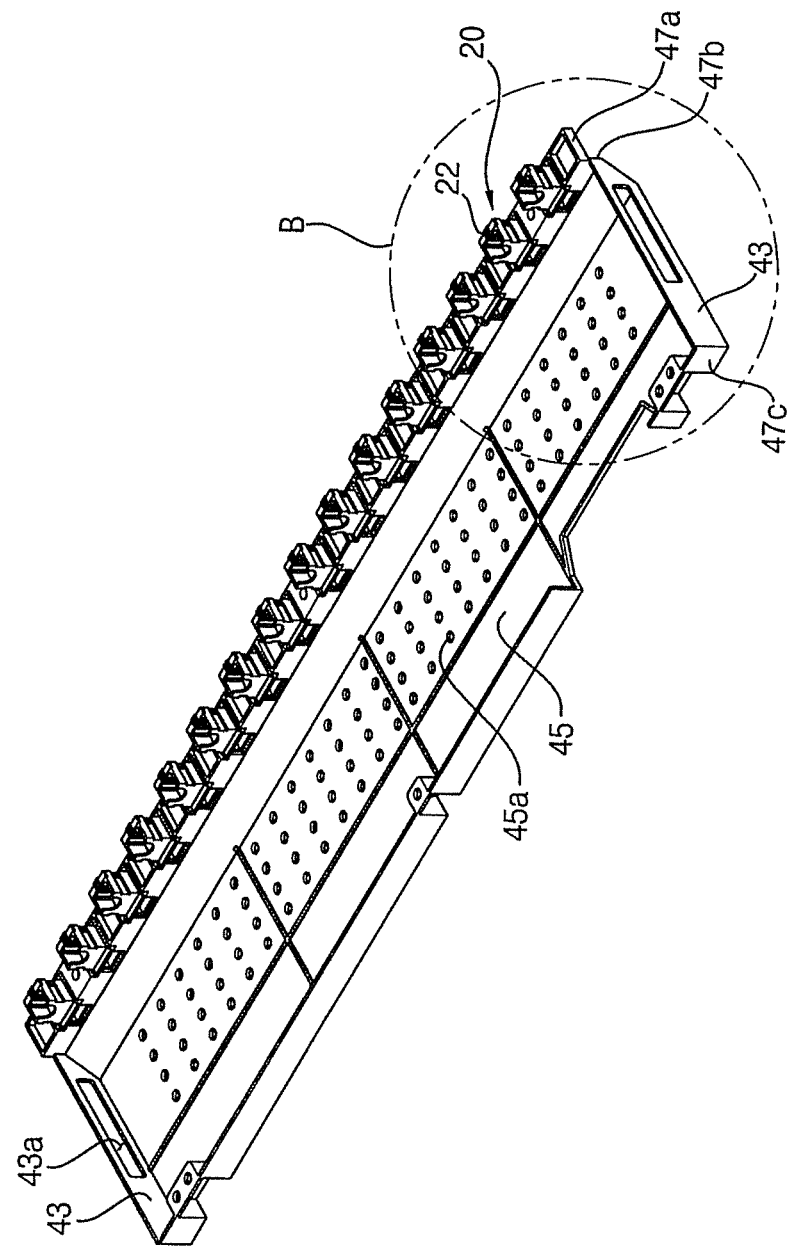
FIG. 8 is an exemplary perspective view illustrating the lamp sockets combined with the receiving container shown in FIG. 1.
Figure 9:
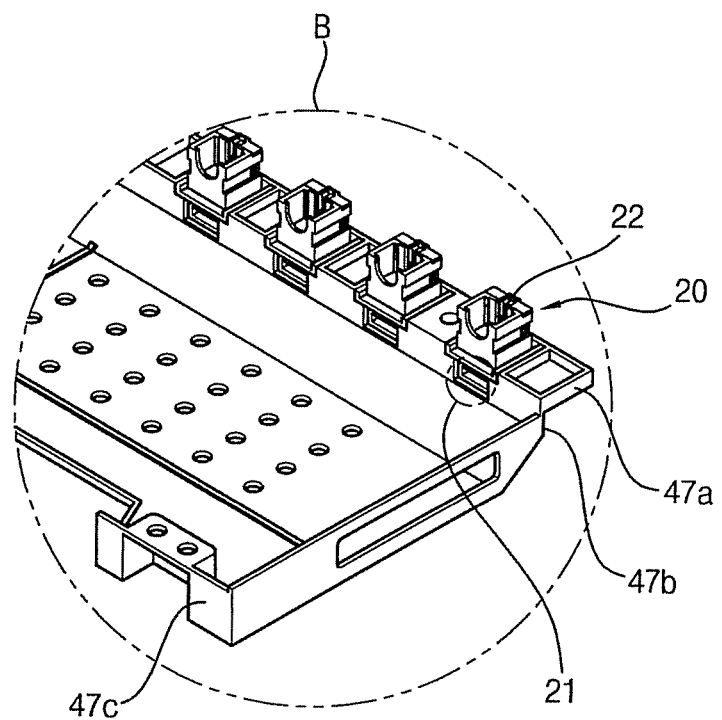
FIG. 9 is an exemplary enlarged perspective view illustrating a portion 'B' shown in FIG. 8.

FIG. 6 is a perspective view illustrating a receiving container in accordance with another example embodiment of the present invention without the lamp sockets shown in FIG. 1. FIG. 6 also reflects the underside of the receiving container shown in the FIG. 5. FIG. 7 is an enlarged perspective view illustrating a portion 'A' shown in FIG. 6. FIG. 8 is a perspective view illustrating the lamp sockets combined with the receiving container shown in FIG. 1. FIG. 9 is an enlarged perspective view illustrating a portion 'B' shown in FIG. 8.

Referring to FIGS. 6 to 9, the lamp socket 20 comprises a lamp holding part 22 and an inverter holding part 21. The lamp holding part 22 is on an upper portion of the lamp socket 20 to hold the lamp electrode 133a (shown in FIG. 1), and is electrically connected to a lead wire (not shown). The inverter holding part 21 is on a lower portion of the lamp socket 20 to receive the electric power for driving the lamp 133 (shown in FIG. 1). The lamp socket 20 is combined with the inverter receiving container 40 through a socket receiving hole 30.

In FIGS. 6 and 7, the socket receiving hole 30 is formed on an extended wall 47a that protrudes from an upper side of a longitudinal sidewall 47b of the inverter receiving container 40. The longitudinal sidewall 47b protrudes from a longitudinal edge of a bottom plate 45. The socket receiving hole 30 is separated from a space for receiving the inverter 50 (shown in FIG. 2) by a protruded portion 33 that protrudes from an end portion of the longitudinal sidewall 47b to prevent an electric interaction between the lead wire and the inverter 50. For example, the lamp socket 20 may be received in the socket receiving hole 30 in a vertical direction.

The socket receiving hole 30 may further include a stepped portion 31 on a side surface facing the lamp socket 20 so that the lamp socket 20 may be easily received in the socket receiving hole 30. Thus, the lamp socket 20 may be securely combined with the inverter receiving container 40. In addition, the socket receiving hole 30 may have a hook hole (not shown) so that the lamp socket 20 may be hooked in the socket receiving hole 30.

With reference now to the FIGS. 8 and 9, after the lamp socket 20 is inserted into the socket receiving hole 30 of the inverter receiving container 40 by a sliding combination, an inverter pad 51 (shown in FIG. 4) of the inverter 50 (shown in FIG. 4) is inserted into the inverter holding part 21 of the lamp socket 20 by a sliding combination so that the inverter 50 is electrically connected to the lamp socket 20.

Referring again to FIG. 6 to 9, the socket receiving hole 30 is formed at the extended side wall that protrudes from the longitudinal sidewall 47b of the inverter receiving container 40. A combining portion 41a, 41b and 41c is formed on an opposite longitudinal sidewall 47c of the inverter receiving container 40. The bottom chassis 150 is combined with the inverter receiving container 40 through the combining portion 41a, 41b and 41c of the inverter receiving container 40. For example, the combining portion 41a, 41b and 41c may include side fixing portions 41a and 41b and a central fixing portion 41c.

In FIGS. 6 to 9, the bottom plate 45, the longitudinal sidewall 47b, the opposite longitudinal sidewall 47c and horizontal sidewalls 43 of the receiving container 40 form an inverter receiving portion. For example, the inverter receiving portion has a space for receiving the inverter.

A window 43a may be formed on the horizontal sidewall 43 to dissipate heat generated from the inverter and the lamp 133. The bottom plate 45 supports the inverter 50. Also, a plurality of holes 45a may be formed through the bottom plate 45 to dissipate the heat generated from an electric element such as a transformer. For example, the holes 45a are spaced apart from each other by a constant distance. When an amount of the heat is increased, the distance between adjacent holes 46a may be decreased.

According to the present invention, an aligning plate for aligning the lamp sockets may be omitted so that the manufacturing process for the backlight assembly may be automated. Thus, the manufacturing process may be simplified, and a manufacturing time period may be decreased. In addition, manufacturing costs may be decreased.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly comprising:
at least one lamp including a lamp electrode;
at least one lamp socket holding the lamp;
an inverter applying electric power to the lamp; and
a receiving container comprising a socket receiving portion corresponding to an end portion of the lamp to receive the lamp socket, and an inverter receiving portion for receiving the inverter, the socket receiving portion and inverter receiving portion defining a single unitary indivisible part,
wherein the socket receiving portion is formed at an extended sidewall that protrudes from an upper side of a longitudinal sidewall; wherein the longitudinal sidewall protrudes along and from a longitudinal edge of a bottom plate of the receiving container, which defines a longer side of the receiving container.

2. The backlight assembly of claim 1, wherein the socket receiving portion is separated from the inverter receiving portion by a separating bar extended from an end portion of the longitudinal sidewall.

3. The backlight assembly of claim 2, wherein the socket receiving portion further comprises a stepped portion on a side surface facing the lamp socket; and wherein the lamp socket is combined with the socket receiving portion through a sliding combination.

4. The backlight assembly of claim 3, wherein the socket receiving portion further comprises a hook portion on the stepped portion to hold the lamp socket.

5. The backlight assembly of claim 1, wherein the socket receiving portion is separated from the inverter receiving portion by a protruded portion that protrudes from an end portion of the longitudinal sidewall.

6. The backlight assembly of claim 5, wherein the socket receiving portion further comprises a stepped portion on a side surface facing the lamp socket so that the lamp socket is combined with the socket receiving portion in a vertical direction.

7. The backlight assembly of claim 6, wherein the socket receiving portion further comprises a hook portion on the stepped portion to hold the lamp socket.

8. The backlight assembly of claim 1, wherein a hole for dissipating heat generated from the inverter is formed through the bottom plate.

9. The backlight assembly of claim 8, wherein the receiving container comprises a combining portion through which the receiving container is combined with a bottom chassis.

10. The backlight assembly of claim 9, wherein the combining portion is formed on an opposite longitudinal sidewall adjacent to corners of the receiving container, and the opposite longitudinal sidewall faces the longitudinal sidewall adjacent to the socket receiving portion.

11. The backlight assembly of claim 10, wherein a window is formed on a horizontal sidewall of the receiving container to dissipate heat generated from the inverter.

12. The backlight assembly of claim 1, wherein the lamp socket comprises a lamp holding part electrically connected to the lamp electrode and an inverter holding part on a lower portion of the lamp socket to receive electric power for driving the lamp.

13. A liquid crystal display (LCD) device comprising:
an LCD panel displaying an image; and
a backlight assembly supplying the LCD panel with light, the backlight assembly comprising:
at least one lamp comprising a lamp electrode;
at least one lamp socket holding the lamp electrode;
an inverter applying electric power to the lamp; and a receiving container including a socket receiving portion corresponding to an end portion of the lamp to receive the lamp socket, and an inverter receiving portion for receiving the inverter, the socket receiving portion and inverter receiving portion defining a single unitary indivisible part, wherein the socket receiving portion is formed at an extended sidewall that protrudes from an upper side of a longitudinal sidewall; wherein the longitudinal sidewall protrudes along and from a longitudinal edge of a bottom plate of the receiving container, which defines a longer side of the receiving container.

\* \* \* \* \*